US008005654B2

(12) United States Patent
Boldyrev et al.

(10) Patent No.: US 8,005,654 B2
(45) Date of Patent: Aug. 23, 2011

(54) METHOD, APPARATUS AND COMPUTER PROGRAM PRODUCT FOR INTELLIGENT WORKLOAD CONTROL OF DISTRIBUTED STORAGE

(75) Inventors: Sergey Boldyrev, Helsinki (FI); Olli Teppo Kalevi Tyrkkö, Espoo (FI); Antti Tuomas Lappeteläinen, Espoo (FI)

(73) Assignee: Nokia Corporation, Espoo (FI)

( * ) Notice: Subject to any disclaimer, the term of this patent is extended or adjusted under 35 U.S.C. 154(b) by 509 days.

(21) Appl. No.: 11/957,765

(22) Filed: Dec. 17, 2007

(65) Prior Publication Data

US 2009/0157378 A1   Jun. 18, 2009

(51) Int. Cl.
 *G06F 17/50* (2006.01)
 *G06F 15/16* (2006.01)
(52) U.S. Cl. .................. 703/2; 703/6; 706/13; 709/216
(58) Field of Classification Search .................. 703/2, 5, 703/6; 709/203, 245, 235, 216, 226; 715/734; 712/16; 706/13
See application file for complete search history.

(56) References Cited

U.S. PATENT DOCUMENTS

| | | | | |
|---|---|---|---|---|
| 5,675,739 | A * | 10/1997 | Eilert et al. | 709/226 |
| 5,752,067 | A * | 5/1998 | Wilkinson et al. | 712/16 |
| 5,832,222 | A * | 11/1998 | Dziadosz et al. | 709/224 |
| 6,633,854 | B1 * | 10/2003 | Moore | 706/13 |
| 6,665,706 | B2 * | 12/2003 | Kenner et al. | 709/203 |
| 7,379,067 | B2 * | 5/2008 | Deering et al. | 345/506 |
| 7,512,888 | B2 * | 3/2009 | Sugino et al. | 715/734 |
| 2005/0125521 | A1 * | 6/2005 | Grimm et al. | 709/223 |
| 2008/0077366 | A1 * | 3/2008 | Neuse et al. | 703/2 |

OTHER PUBLICATIONS

Rabin, "Efficient Dispersal of Information for Security, Load Balancing, and Fault Tolerance," *Journal of the ACM*, vol. 36(2), pp. 335-348, 1989, http://portal.acm.org/citation.cfm?id=62050.
Alon et al., "Scalable Secure Storage When Half the System is Faulty," *Proc. 27th International Colloquium on Automata, Languages and Programming (ICALP)*, vol. 1853 of Lecture Notes in computer Science, pp. 576-587, Spring 2000, http://citeseer.ist.psu.edu/rd/69414499%2C562385%2C1%2C0.25%2CDownload/http://citeseer.ist.psu.edu/cache/papers/cs/27218/http:zSzzSzwww.math.tau.ac.ilzSz%7EhaimkzSzpaperszSzsecure.pdf/alon02scalable.pdf.
Alon et al., "Addendum to Scalable Secure Storage When Half the System is Faulty," *Information and Computation*, 2004; http://citeseer.ist.psu.edu/rd/0%2C673942%2C1%2C0.25%2CDownload/http://citeseer.ist.psu.edu/cache/papers/cs/31859/http:zSzzSzwww.cs.huji.ac.ilzSz%7EdaliazSzpubszSzAKKMS-add.pdf/addendum-to-scalable-secure.pdf.
Garay et al., "Secure Distributed Storage and Retrieval," *Theoretical Computer Science*, 243(1-2); pp. 363-389, 2000; http://citeseer.ist.psu.edu/rd/0%2C302947%2C1%2C0.25%2CDownload/http://citeseer.ist.psu.edu/cache/papers/cs/14825/http:zSzzSzwww.bell-labs.comzSzuserzSzgarayzSzvault.pdf/garay97secure.pdf.
Goodson et al., "Efficient Byzantine-tolerant erasure-coded storage," *Proc. International Conference on Dependable Systems and Networks*, (DSN-2004), pp. 135-144, 2004; http://citeseer.ist.psu.edu/rd/0%2C699023%2C1%2C0.25%2CDownload/http://citeseer.ist.psu.edu/cache/papers/cs/33303/http:zSzzSzwww.ece.cmu.eduzSz%7EreiterzSzpaperszSz.zSz2004zSzDSN.pdf/goodson04efficient.pdf.

(Continued)

*Primary Examiner* — Thai Phan
(74) *Attorney, Agent, or Firm* — Alston & Bird LLP

(57) ABSTRACT

A method, apparatus and computer program product are provided for generating a multiple-input, multiple output (MIMO) workload model of a distributed storage environment on a plurality of predictive controller devices. The MIMO models can then be utilized by the predictive controller to manage storage resources on a distributed storage system.

23 Claims, 6 Drawing Sheets

OTHER PUBLICATIONS

Krawczyk, "Distributed Fingerprints and Secure Information Dispersal," *Proc. 12th ACM Symposium on Principles of Distributed Computer (PQDC)*, 207-218, 1993, http://portal.acm.org/citation.cfrn?id=164075.

Kember et al., "A Continuous Analysis of Multi-Input, Multi-Output Predictive Control," *ISA Transactions* 46 (2007), pp. 419-428.

Cui et al., "Cross-Layer Design of Energy-Constrained Networks Using Cooperative MIMO Techniques," *Signal Processing* 86 (2006) pp. 1804-1814.

Realp et al., "Generalized Model for Scheduling in MIMO Multiple Access Systems: A Cross-Layer Approach," *Signal Processing* 86 (2006), pp. 1834-1847.

Chen at al., "Frequency Domain Blind MIMO System Identification Based on Second- and Higher Order Statistics," *IEEE Transactions on Signal Processing*, vol. 49, No. 8, Aug. 2001, pp. 1677-1688.

Bertsekas, *Dynamic Programmimg and Optical Control*, vol. 1, Athena Scientific, Second Edition, 2000, Chapter 6, pp. 261-280.

Buyya et al., "Economic Models for Resource Management and Scheduling in Grid Computing," *Concurrency and Computation: Practice and Experience*, vol. 14(13-15), pp. 1507-1542, 2002, http://citeseer.ist.psu.edu/rd/0%2C747207%2C1%2C0.25%2CDownload/http://citeseer.ist.psu.edu/cache/papers/cs2/563/http:zSzzSzwww.buyya.comzSzpaperszSzemodelsgrid.pdf/buyya02economic.pdf.

England et al. A Stochastic Control Model for Deployment of Dynamic Grid Services, *Fifth IEE/ACM International Workshop on Grid Computing*, 2004, pp. 192-199, http://portal.acm.org/citation.cfm?id=1032646.1033245&coll=GUIDE&dl=GUIDE&CFID=8017079&CFTOKEN=60240948.

Box et al. *Time Series Analysis, Forcasting and Control*, Third Edition, Prentice-Hall, Upper Saddle River, NJ (1994), Chapter 9, pp. 300-334.

Geweke, "Priors for Macroeconomic Time Series and Their Application," *Discussion Paper No. 64, Federal Reserve Bank of Minneapolis, Institute for Empirical Macroeconomics*,, Minneapolis, MN (1992), http://citeseer.ist.psu.edu/rd/69414499%2C112602%2C1%2C0.25%2CDownload/http://citeseer.ist.psu.edu/cache/papers/cs/2738/ftp:zSzzSzftp.econ.umn.eduzSzoutgoingzSzgewekezSzpaperszSzpaper53zSzText.pdf/priors-for-macroeconomic-time.pdf.

Hannan, "Regression for Time Series," *Time Series Analysis*, M. Rosenblatt, Editor, John Wiley & Sons, Inc., New York (1963), pp. 17-37.

Bendat et al., "Random data: Analysis and measurement procedures," $2^{nd}$ Edition, John Wiley, New York, 1986, Chapter 6 & 7, pp. 189-213 and 240-252.

Dentcheva et al., "Optimal Power Generation Under Uncertainty via Stochastic Programming," *Stochastic Programming: Numerical Techniques and Engineering Applications*, K. Marti and P. Knall, Editors, Lectures Notes in Economics and Mathematical Systems, 458, pp. 22-56 (1997), http://citeseer.ist.psu.edu/rd/69414499%2C91359%2C1%2C0.25%2CDownload/http://citeseer.ist.psu.edu/cache/papers/cs/4213/http:zSzzSzzSzwww-iam.mathematik.hu-berlin.dezSz%7EromischzSz.zSzpaperszSzMartifinzPz.pdf/dentcheva97optimal.pdf.

Berthold et al., *Intelligent Data Analysis*, $2^{nd}$ Edition, 2003, Chapter 3, pp. 93-100.

\* cited by examiner

METHOD, APPARATUS AND COMPUTER PROGRAM PRODUCT FOR INTELLIGENT WORKLOAD CONTROL OF DISTRIBUTED STORAGE

TECHNOLOGICAL FIELD

Embodiments of the present invention relate generally to distributed electronic storage management and, more particularly, relate to a method, apparatus and computer program product for distributed electronic storage management in a computing system where the system is dynamically changing due to the existence of multitude of uncertainties.

BACKGROUND

Conventional distributed electronic storage management solutions are well known and widely utilized. These solutions are often configured to manage storage elements that are connected to a distributed computing system. Storage elements, comprised in such a system, can fall into two categories, namely, storage consumers and storage providers. On a static system, rules and policies can be determined in advance of the management system's operation. This can be done through benchmarking and prior testing with respect to the storage consumers and storage providers that reside on the system. Additionally, in a static system, each storage element can be identified, its physical connection type and location can be determined, and its expected workload contribution to the system can be predicted prior to operation of the management solution. As such, an adequate analytical workload model of the system, comprising each storage element, can be generated that indicates the behavior of the system. The behavioral model, often called a workload model, can be utilized to optimize the operation of the management of the static system.

While static system distributed electronic storage management solutions are known, electronic storage management solutions for dynamic systems are less common due to the implicit complexity of modeling the behavior, or workload, of a dynamic system. A dynamic system can be defined as a system where a multitude of uncertainties exist. As such, the architecture and workload of a dynamic system cannot be effectively predicted using schemes developed for static systems. Techniques such as benchmarking, prior testing, and conventional workload modeling cannot be utilized in a dynamic system.

Additionally, dynamic systems are becoming more and more common. Due to the rapid growth of mobile computing devices, including cellular phones, areas referred to as smart spaces are becoming popular. In a smart space, the storage resources of mobile computing devices are shared though each device's connection to the system. As such, any device in the smart space can access storage on any other device, creating a dynamic distributed storage environment.

However, difficulties arise when attempting to model and predict the behavior of such a system. Since smart spaces are often comprised of mobile computing devices, any device can enter or leave the system at anytime. Since storage resources are distributed over several devices, and the storage consumers are not always located in the device where the desired content resides, it can be challenging to provide uniform storage to all devices on the system. Additionally, since numerous uncertainties exist, including, among other uncertainties, connectivity and device location, the systems cannot be effectively modeled using the conventional methods.

A remedial solution to problem of dynamic system storage management is to simply copy all content on the system to all devices. However, such a solution would be infeasible when factors such as the available storage space, power consumption, performance, and connection reliability are considered. Such a solution would result in excessive power consumption and substantial utilization of communication channel bandwidth resulting in latency even when sufficient storage capacity is available. Further, due to the dynamic connection topology, it cannot be guaranteed that data will be reliably transmitted and stored on each device. Accordingly, such a solution would not be effective, and some instances infeasible.

Thus, it would be advantageous to provide a mechanism for developing a behavior or workload model of a system, that can be used to manage and control a dynamic distributed electronic storage system. The workload models should be able to account for the existence of numerous uncertainties on a system in a real-time fashion, such that models of the system can be defined at any instant in time.

BRIEF SUMMARY

A method, apparatus and computer program product are therefore provided to generate a multiple-input multiple-output workload (MIMO) model of a distributed storage system. The MIMO workload model can be generated on a plurality of devices. Using the MIMO model, each device can operate as a predictive controller of the distributed storage system. As such, each device can utilize the MIMO workload models to manage storage resources on a distributed storage system. In some embodiments, the MIMO model can be used in conjunction with cost functions to improve the operation of the distributed storage system. The cost functions can be based on power consumption, performance, and/or reliability variables. In some embodiments, according to the MIMO model and the cost functions, data in the distributed storage system can be dispersed or aggregated using an information dispersion algorithm and a skewed or non-uniform dispersion scheme.

In some embodiments, a MIMO workload model of a distributed storage environment can be generated on at least one predictive controller. The MIMO workload model can be generated by converting a plurality of requests per some predefined period of time into a moving average. In some embodiments, the moving average can be an infinite moving average. The moving average can then be transformed to the frequency domain. As a result, in some embodiments, a Fourier transform of a time series can be estimated and a corresponding time-domain model can be computed. Accordingly, a workload model can be identified through spectral analysis and by extracting spectral components. Further, break points for reliable and non-reliable nodes can be predicted, and an efficiency estimation can be performed to refine the workload model using, in part, cost functions and cost weighting factors based on at least one of power consumption, performance, and reliability.

BRIEF DESCRIPTION OF THE SEVERAL VIEWS OF THE DRAWING(S)

Having thus described embodiments of the invention in general terms, reference will now be made to the accompanying drawings, which are not necessarily drawn to scale, and wherein:

FIG. 1 is a schematic block diagram of a mobile terminal according to an exemplary embodiment of the present invention;

FIG. 2 a schematic block diagram of a wireless communications system according to an exemplary embodiment of the present invention;

DETAILED DESCRIPTION

Figure 1:
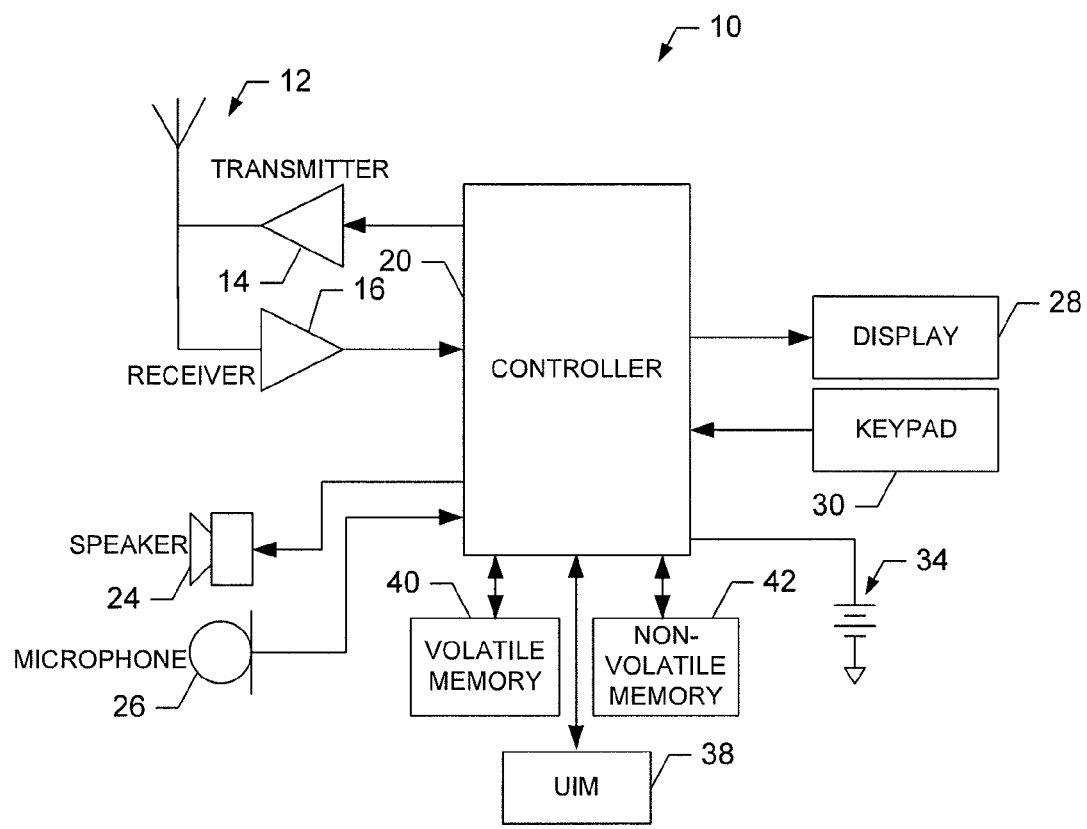

Embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout.

FIG. 1 illustrates a block diagram of a mobile terminal 10 that would benefit from embodiments of the present invention. It should be understood, however, that a mobile telephone as illustrated and hereinafter described is merely illustrative of one type of mobile terminal (also known as user equipment) that would benefit from embodiments of the present invention and, therefore, should not be taken to limit the scope of embodiments of the present invention. While one embodiment of the mobile terminal 10 is illustrated and will be hereinafter described for purposes of example, other types of mobile terminals, such as portable digital assistants (PDAs), pagers, mobile computers, mobile televisions, gaming devices, laptop computers, cameras, video recorders, GPS devices and other types of voice and text communications systems, can readily employ embodiments of the present invention. Furthermore, devices that are not mobile may also readily employ embodiments of the present invention.

The system and method of embodiments of the present invention will be primarily described below in conjunction with mobile communications applications. However, it should be understood that the system and method of embodiments of the present invention can be utilized in conjunction with a variety of other applications, both in the mobile communications industries and outside of the mobile communications industries.

The mobile terminal 10 includes an antenna 12 (or multiple antennae) in operable communication with a transmitter 14 and a receiver 16. The mobile terminal 10 further includes an apparatus, such as a controller 20 or other processing element, that provides signals to and receives signals from the transmitter 14 and receiver 16, respectively. The signals include signaling information in accordance with the air interface standard of the applicable cellular system, and also user speech, received data and/or user generated data. In this regard, the mobile terminal 10 is capable of operating with one or more air interface standards, communication protocols, modulation types, and access types. By way of illustration, the mobile terminal 10 is capable of operating in accordance with any of a number of first, second, third and/or fourth-generation communication protocols or the like. For example, the mobile terminal 10 may be capable of operating in accordance with second-generation (2G) wireless communication protocols IS-136 (time division multiple access (TDMA)), GSM (global system for mobile communication), and IS-95 (code division multiple access (CDMA)), or with third-generation (3G) wireless communication protocols, such as Universal Mobile Telecommunications System (UMTS), CDMA2000, wideband CDMA (WCDMA) and time division-synchronous CDMA (TD-SCDMA), with fourth-generation (4G) wireless communication protocols or the like.

It is understood that the apparatus such as the controller 20 includes means, such as circuitry, desirable for implementing audio and logic functions of the mobile terminal 10. For example, the controller 20 may be comprised of a digital signal processor device, a microprocessor device, and various analog to digital converters, digital to analog converters, and other support circuits. Control and signal processing functions of the mobile terminal 10 are allocated between these devices according to their respective capabilities. The controller 20 thus may also include the functionality to convolutionally encode and interleave message and data prior to modulation and transmission. The controller 20 can additionally include an internal voice coder, and may include an internal data modem. Further, the controller 20 may include functionality to operate one or more software programs, which may be stored in memory. For example, the controller 20 may be capable of operating a connectivity program, such as a conventional Web browser. The connectivity program may then allow the mobile terminal 10 to transmit and receive Web content, such as location-based content and/or other web page content, according to a Wireless Application Protocol (WAP), Hypertext Transfer Protocol (HTTP) and/or the like, for example.

The mobile terminal 10 may also comprise a user interface including an output device such as a conventional earphone or speaker 24, a microphone 26, a display 28, and a user input interface, all of which are coupled to the controller 20. The user input interface, which allows the mobile terminal 10 to receive data, may include any of a number of devices allowing the mobile terminal 10 to receive data, such as a keypad 30, a touch display (not shown) or other input device. In embodiments including the keypad 30, the keypad 30 may include the conventional numeric (0-9) and related keys (#, *), and other hard and/or soft keys used for operating the mobile terminal 10. Alternatively, the keypad 30 may include a conventional QWERTY keypad arrangement. The keypad 30 may also include various soft keys with associated functions. In addition, or alternatively, the mobile terminal 10 may include an interface device such as a joystick or other user input interface. The mobile terminal 10 further includes a battery 34, such as a vibrating battery pack, for powering various circuits that are required to operate the mobile terminal 10, as well as optionally providing mechanical vibration as a detectable output.

The mobile terminal 10 may further include a user identity module (UIM) 38. The UIM 38 is typically a memory device having a processor built in. The UIM 38 may include, for example, a subscriber identity module (SIM), a universal integrated circuit card (UICC), a universal subscriber identity module (USIM), a removable user identity module (R-UIM), etc. The UIM 38 typically stores information elements related to a mobile subscriber. In addition to the UIM 38, the mobile terminal 10 may be equipped with memory. For example, the mobile terminal 10 may include volatile memory 40, such as volatile Random Access Memory (RAM) including a cache area for the temporary storage of data. The mobile terminal 10 may also include other non-volatile memory 42, which can be embedded and/or may be removable. The non-volatile memory 42 can additionally or alternatively comprise an electrically erasable programmable read only memory (EEPROM), flash memory or the like, such as that available from the SanDisk Corporation of Sunnyvale, Calif., or Lexar Media Inc. of Fremont, Calif. The memories can store any of a number of pieces of information, and data, used by the mobile terminal 10 to implement the functions of the mobile terminal 10. For example, the memories can include an identifier, such as an international mobile equipment identification (IMEI) code, capable of uniquely identifying the mobile terminal 10.

Figure 2:
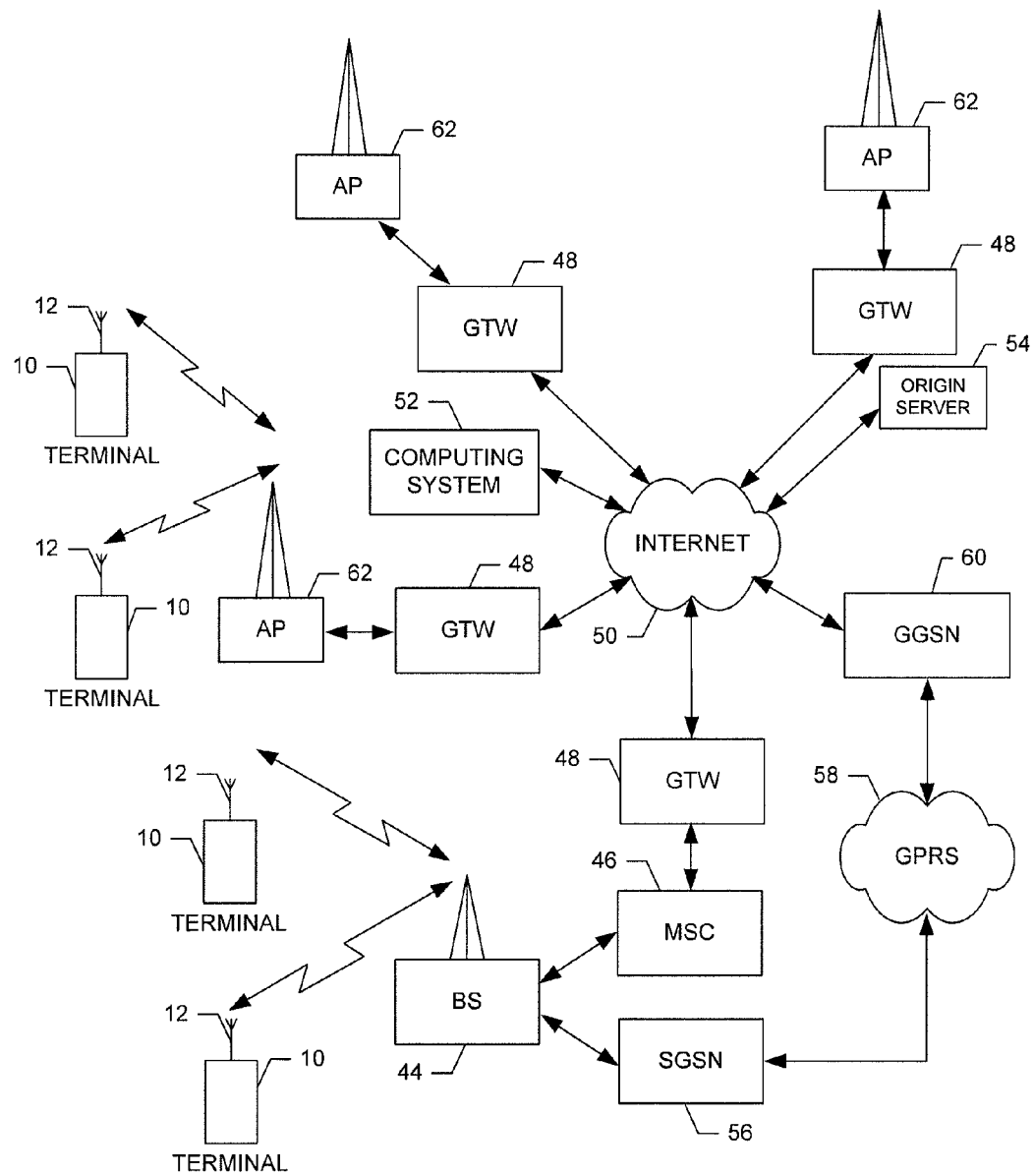

FIG. 2 is a schematic block diagram of a wireless communications system according to an exemplary embodiment of the present invention. Referring now to FIG. 2, an illustration of one type of system that would benefit from embodiments of the present invention is provided. The system includes a plurality of network devices. As shown, one or more mobile terminals 10 may each include an antenna 12 for transmitting signals to and for receiving signals from a base site or base station (BS) 44. The base station 44 may be a part of one or more cellular or mobile networks each of which includes elements required to operate the network, such as a mobile switching center (MSC) 46. As well known to those skilled in the art, the mobile network may also be referred to as a Base Station/MSC/Interworking function (BMI). In operation, the MSC 46 is capable of routing calls to and from the mobile terminal 10 when the mobile terminal 10 is making and receiving calls. The MSC 46 can also provide a connection to landline trunks when the mobile terminal 10 is involved in a call. In addition, the MSC 46 can be capable of controlling the forwarding of messages to and from the mobile terminal 10, and can also control the forwarding of messages for the mobile terminal 10 to and from a messaging center. It should be noted that although the MSC 46 is shown in the system of FIG. 2, the MSC 46 is merely an exemplary network device and embodiments of the present invention are not limited to use in a network employing an MSC.

The MSC 46 can be coupled to a data network, such as a local area network (LAN), a metropolitan area network (MAN), and/or a wide area network (WAN). The MSC 46 can be directly coupled to the data network. In one typical embodiment, however, the MSC 46 is coupled to a gateway device (GTW) 48, and the GTW 48 is coupled to a WAN, such as the Internet 50. In turn, devices such as processing elements (e.g., personal computers, server computers or the like) can be coupled to the mobile terminal 10 via the Internet 50. For example, as explained below, the processing elements can include one or more processing elements associated with a computing system 52, origin server 54, and/or the like, as described below.

The BS 44 can also be coupled to a signaling GPRS (General Packet Radio Service) support node (SGSN) 56. As known to those skilled in the art, the SGSN 56 is typically capable of performing functions similar to the MSC 46 for packet switched services. The SGSN 56, like the MSC 46, can be coupled to a data network, such as the Internet 50. The SGSN 56 can be directly coupled to the data network. In a more typical embodiment, however, the SGSN 56 is coupled to a packet-switched core network, such as a GPRS core network 58. The packet-switched core network is then coupled to another GTW 48, such as a GTW GPRS support node (GGSN) 60, and the GGSN 60 is coupled to the Internet 50. In addition to the GGSN 60, the packet-switched core network can also be coupled to a GTW 48. Also, the GGSN 60 can be coupled to a messaging center. In this regard, the GGSN 60 and the SGSN 56, like the MSC 46, may be capable of controlling the forwarding of messages, such as MMS messages. The GGSN 60 and SGSN 56 may also be capable of controlling the forwarding of messages for the mobile terminal 10 to and from the messaging center.

In addition, by coupling the SGSN 56 to the GPRS core network 58 and the GGSN 60, devices such as a computing system 52 and/or origin server 54 may be coupled to the mobile terminal 10 via the Internet 50, SGSN 56 and GGSN 60. In this regard, devices such as the computing system 52 and/or origin server 54 may communicate with the mobile terminal 10 across the SGSN 56, GPRS core network 58 and the GGSN 60. By directly or indirectly connecting mobile terminals 10 and the other devices (e.g., computing system 52, origin server 54, etc.) to the Internet 50, the mobile terminals 10 may communicate with the other devices and with one another, such as according to the Hypertext Transfer Protocol (HTTP) and/or the like, to thereby carry out various functions of the mobile terminals 10.

Although not every element of every possible mobile network is shown and described herein, it should be appreciated that the mobile terminal 10 may be coupled to one or more of any of a number of different networks through the BS 44. In this regard, the network(s) may be capable of supporting communication in accordance with any one or more of a number of first-generation (1G), second-generation (2G), 2.5G, third-generation (3G), 3.9G, fourth-generation (4G) mobile communication protocols or the like. For example, one or more of the network(s) can be capable of supporting communication in accordance with 2G wireless communication protocols IS-136 (TDMA), GSM, and IS-95 (CDMA). Also, for example, one or more of the network(s) can be capable of supporting communication in accordance with 2.5G wireless communication protocols GPRS, Enhanced Data GSM Environment (EDGE), or the like. Further, for example, one or more of the network(s) can be capable of supporting communication in accordance with 3G wireless communication protocols such as a UMTS network employing WCDMA radio access technology. Some narrow-band analog mobile phone service (NAMPS), as well as total access communication system (TACS), network(s) may also benefit from embodiments of the present invention, as should dual or higher mode mobile stations (e.g., digital/analog or TDMA/CDMA/analog phones).

The mobile terminal 10 can further be coupled to one or more wireless access points (APs) 62. The APs 62 may comprise access points configured to communicate with the mobile terminal 10 in accordance with techniques such as, for example, radio frequency (RF), Bluetooth (BT), infrared (IrDA) or any of a number of different wireless networking techniques, including wireless LAN (WLAN) techniques such as IEEE 802.11 (e.g., 802.11a, 802.11b, 802.11g, 802.11n, etc.), world interoperability for microwave access (WiMAX) techniques such as IEEE 802.16, and/or ultra wideband (UWB) techniques such as IEEE 802.15 and/or the like. The APs 62 may be coupled to the Internet 50. Like with the MSC 46, the APs 62 can be directly coupled to the Internet 50. In one embodiment, however, the APs 62 are indirectly coupled to the Internet 50 via a GTW 48. Furthermore, in one embodiment, the BS 44 may be considered as another AP 62. As will be appreciated, by directly or indirectly connecting the mobile terminals 10 and the computing system 52, the origin server 54, and/or any of a number of other devices, to the Internet 50, the mobile terminals 10 can communicate with one another, the computing system, etc., to thereby carry out various functions of the mobile terminals 10, such as to transmit data, content or the like to, and/or receive content, data or the like from, the computing system 52. As used herein, the terms "data," "content," "information" and similar terms may be used interchangeably to refer to data capable of being transmitted, received and/or stored in accordance with embodiments of the present invention. Thus, use of any such terms should not be taken to limit the spirit and scope of embodiments of the present invention.

As will be appreciated, by directly or indirectly connecting the mobile terminals 10 and the computing system 52, the origin server 54, and/or any of a number of other devices, to the Internet 50, the mobile terminals 10 can communicate with one another, the computing system, 52, the origin server 54, etc., to thereby carry out various functions of the mobile terminals 10, such as to transmit data, content or the like to, and/or receive content, data or the like from, the computing system 52, and/or the origin server 54, etc.

Although not shown in FIG. 2, in addition to or in lieu of coupling the mobile terminal 10 to computing systems across the Internet 50, the mobile terminal 10 and computing system 52 may be coupled to one another and communicate in accordance with, for example, RF, BT, IrDA or any of a number of different wireline or wireless communication techniques, including LAN, WLAN, WiMAX, UWB techniques and/or the like. One or more of the computing system 52, can additionally, or alternatively, include a removable memory capable of storing content, which can thereafter be transferred to the mobile terminal 10. Further, the mobile terminal 10 can be coupled to one or more electronic devices, such as printers, digital projectors and/or other multimedia capturing, producing and/or storing devices (e.g., other terminals).

Figure 3:
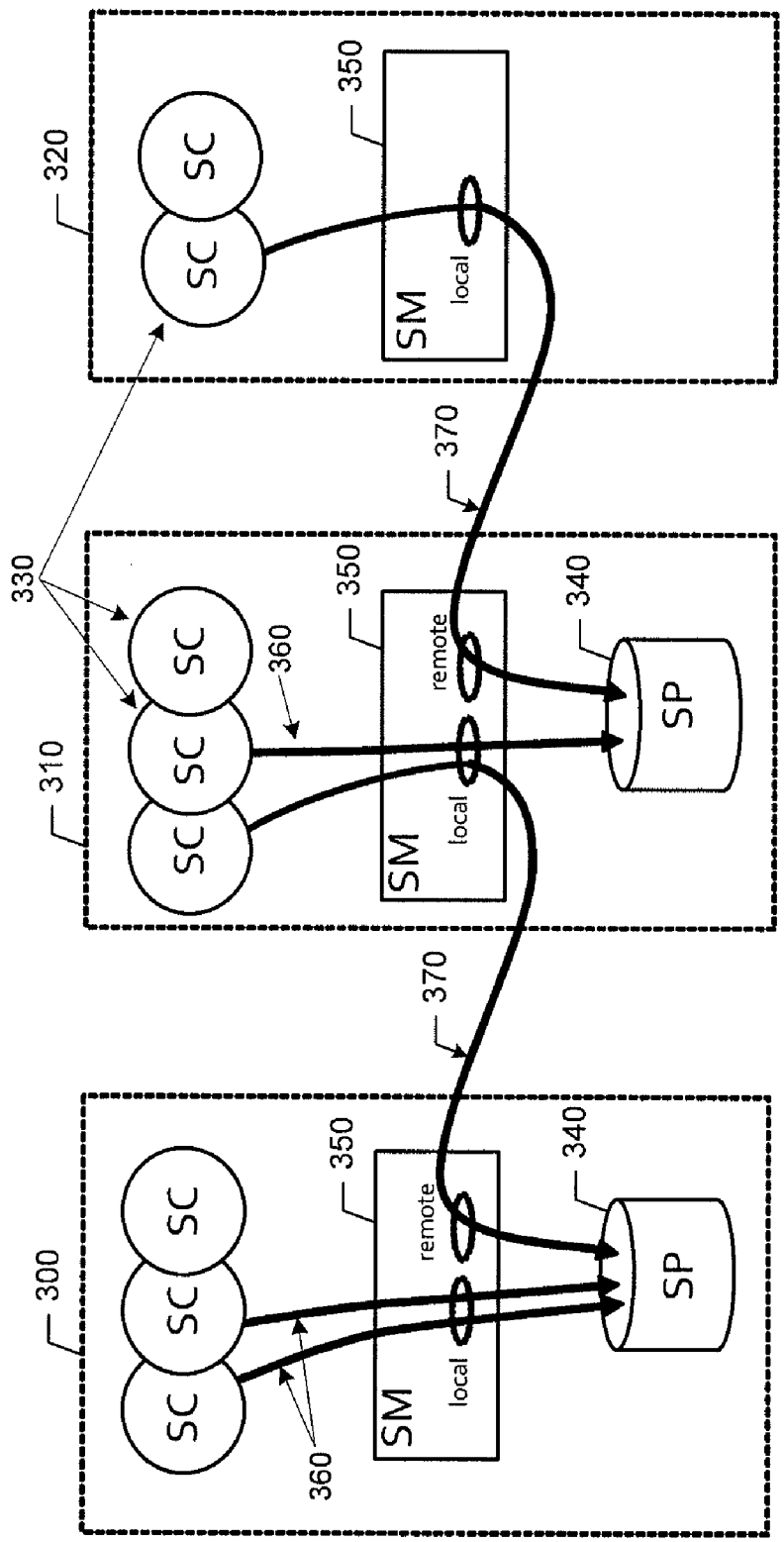
FIG. 3 is an illustration of a dynamic distributed storage system according to one embodiment of the present invention.

FIG. 3 depicts an exemplary dynamic storage system according to various embodiments of the invention. The system of FIG. 3 comprises three devices, 300, 310, and 320. However, it is contemplated that that a dynamic storage system could comprise any number of devices. Devices 300, 310, and 320 can be any electronic device, including but not limited to, a mobile terminal 10, such as that depicted in FIG. 1. Devices 300, 310, and 320 can communicate with each other either directly or through a central communications hub, such as, for example, a base station, as reflected in FIG. 2. Communications between devices can be through any wired or wireless means, including but not limited to, coaxial cable, fiber-optic, RF, BT, IrDA, or any of a number of different wireless networking techniques, including WLAN techniques such as IEEE 802.11 (e.g., 802.11a, 802.11b, 802.11g, 802.11n, etc.), WiMAX techniques such as IEEE 802.16, and/or UWB techniques such as IEEE 802.15 and/or the like.

Each device 300, 310, and 320 can comprise storage consumers 330, storage providers 340, and storage managers 330. Storage consumers 330 can be any entity that is capable of accessing or otherwise utilizing storage resources, such as, for example, an application running on controller 20 of mobile terminal 10. Entities that provide storage resources to a system can be storage providers 340. In some embodiments, storage providers can be, for example, volatile memory 40 or non-volatile memory 42.

Within one or more storage providers, storage containers can be located. Storage containers can be logical atomic data entities used to organize and identify groups of data. In some embodiments, a uniform resource identifier (URI) string can be used to identify data in storage containers. Further, since storage containers can be logical entities, a single storage container can span multiple storage providers. In some embodiments, storage containers can span storage providers where the storage providers are located on separate devices.

In various embodiments, various storage containers can be associated with various storage consumers in a manner that a particular storage consumer utilizes a particular storage container for storage purposes.

In FIG. 3, requests by storage consumers 330 for particular storage containers, and accordingly the associated storage providers 340, are depicted at 360 and 370. Requests 360 are depicted as internal device requests, where the storage consumer and the storage container reside on a common device. On the other hand, requests 370 are external device requests. Requests 370 are external devices requests because they originate from a storage consumer that resides on a device different from the device where the requested storage container resides.

Storage managers 350 can be entities that reside on an associated device and perform storage management of the dynamic storage system depicted in FIG. 3. According to various embodiments, storage managers 350 can monitor and evaluate requests on the system to develop a local workload model. The model can be developed using the requests on the system at any given time. Since the analyzed requests include all external requests, multiple-input multiple-output (MIMO) technology can be used to generate the model. In some embodiments, the requests can be further analyzed by distinguishing between read and write requests. The analysis of the requests can also be done separately for accesses initiated by the storage consumers in the same device, and for accesses initiated by the storage managers in other devices. Accordingly, the resulting MIMO model can be used to represent an entire system in a distributed computing environment which is dynamically changing with a multitude of uncertainties.

In conjunction with the workload model, storage managers can also consider the costs associated with particular disbursements of data on the system. Accordingly, storage managers can develop cost functions that describe the cost of retrieving data from a storage provider or writing data to a storage provider with respect to a storage consumer. The cost functions can be developed using the variables of power consumption, performance (e.g. latency, throughput), and reliability (e.g. data loss, consistency).

Power consumption can be considered because differing devices on a system can have differing power budgets. Some devices may use a battery as a power source, while other devices may be powered by a wired electrical system. As such, each device may be treated differently with respect to power consumption. Similarly, power consumption with respect maintaining a system connection and data transfer may vary among differing devices, and thus can be considered accordingly with respect to those devices.

The performance of devices on the system can also be considered. A future latency estimate can be generated based on, for example, available bandwidth. As such, the level of latency associated with particular devices can factor into the calculation of a cost. Note that the terms performance and latency may be used interchangeably throughout.

Due to the dynamic nature of the system, reliability of devices can also be considered. Reliability issues can arise on a dynamic system because some storage providers, and the data stored within them, may not be available at all times. To counter reliability issues, redundancy of storage containers can be increased to minimize the potential for data loss. As a result of the need to increase the redundancy of storage containers due to reliability concerns, the cost with respect to reliability increases as it relates to a particular storage provider, and therefore can be factored into a cumulative cost function.

Considering these variables, a cumulative cost functions can be developed describing the relationship between storage consumers and storage providers. As such, in some embodiments, cost functions can be spatially correlated. Costs falling within a predefined low threshold can be indicative of a local relationship between a storage consumer and storage provider. On the other hand, costs falling within a predefined high threshold can be indicative of an external relationship between a storage consumer and storage provider.

Further, considering the variables of power consumption, performance, and reliability, an operational strategy can be developed. The storage managers can utilize the operational strategy, with the cost functions, to develop an optimal operation mode with respect to that strategy. In some embodiments, an operational strategy may favor one factor, such as, for example, performance, over another factor, such as, for example, power consumption. As such, in some embodiments, cost weighting factors can be utilized to develop an operational strategy. Through the use of cost weighting factors, one variable can be allotted more importance in a particular operational strategy and the associated optimal operation mode. The cost weighting factors can also be utilized in the construction of an optimized MIMO model.

The storage managers, operating together as a control module, can use the MIMO workload model and the cost functions to determine the optimal operational mode for the distribution, storage, and management of the storage containers on the entire system. The operational mode can have predictive aspects which allow operation of the system without further updates to the MIMO model and the cost functions. Thus, a predictive distributive control scheme can be implemented. When the operational mode is determined, the storage manager can use a desired dispersing scheme to relocate and/or replicate storage containers to appropriate storage providers. However, to ensure that the prediction of the system is accurate, once an operational mode is determined, cost functions can be continually updated based upon new requests. In some embodiments, the sampling of requests to maintain the operational mode can be at a slower rate than the rate utilized to develop the operational mode. If the updates based on the new requests indicate that the system has moved outside of an optimal operation threshold, then a process of re-establishing an optimal operational mode can be utilized.

An additional consideration when determining a system-wide optimal operational mode can be the physical storage capacity of the devices on the system at any given time. Since in some instances it may be advantageous to create redundant storage containers in multiple locations, a natural relationship between an operational mode and the available storage capacity on the system can result. The process of identifying optimal locations for storage containers or the need to replicate storage containers can be known as content dispersion. The implementation of content dispersion can consume additional storage space on the system, which in turn results in additional power consumption and changes to reliability and performance. Thus, due to content dispersion, a relationship can exist between available storage capacity, power consumption, performance, and reliability. As such, the storage capacity of the system can be an additional variable considered in determining an optimal operation mode.

With respect to the MIMO model and the cost functions, consider N storage consumers that are capable of communication with M storage providers, where N and M are integers. Also assume that a set of k requests take place where k is an integer. Then the following model for a multi-access environment, such as a dynamic storage environment, can be constructed using the basic MIMO definition, $$y_k = H_k s_k + w_k.$$

Here, $s_k = (s_1, s_2 \ldots s_{|k|})^{|T|}$ is the transferred data vector which is comprised of k packets. Additionally, each packet can be transmitted with an associated power P, reliability factor R, and latency L. Further, $H_k = (h_1, h_2, \ldots, H_{|k|})$ is an M×|k| workloads cross-coupling matrix, where $h_{j,i}$ represents the impact from the i-th storage consumer in the set of k and the j-th storage provider in state space of $\xi(P, R, L)$. The vector $w_k$ can be complex-valued characteristics of uncertainties modeled by noise. Additionally, $h_{j,i}$ can be a combined weight function of power, reliability and latency parameters, and can be presented in the form of $h_{j,i} = \phi P + \rho R + \phi L$, where $\phi$ corresponds to a weight function for power, $\rho$ corresponds to a weight function for reliability, and $\sigma$ corresponds to a weight function for latency. In this manner, the cost functions can be incorporated into the basic MIMO model and can constitute the control mechanism of the storage management system. As such, in some embodiments, for example, an operational mode can be defined where minimum power is consumed while maintaining reliability and latency factors within a certain range.

Thus, by means of MIMO technology, a distributed storage management system can be implemented as depicted in FIG. 3. The system can be constructed, control algorithms can be derived, distributed traffic can be observed, connectivity can be tracked, distributed scheduling can be estimated, and data dispersion/aggregation can be monitored.

Figure 4:
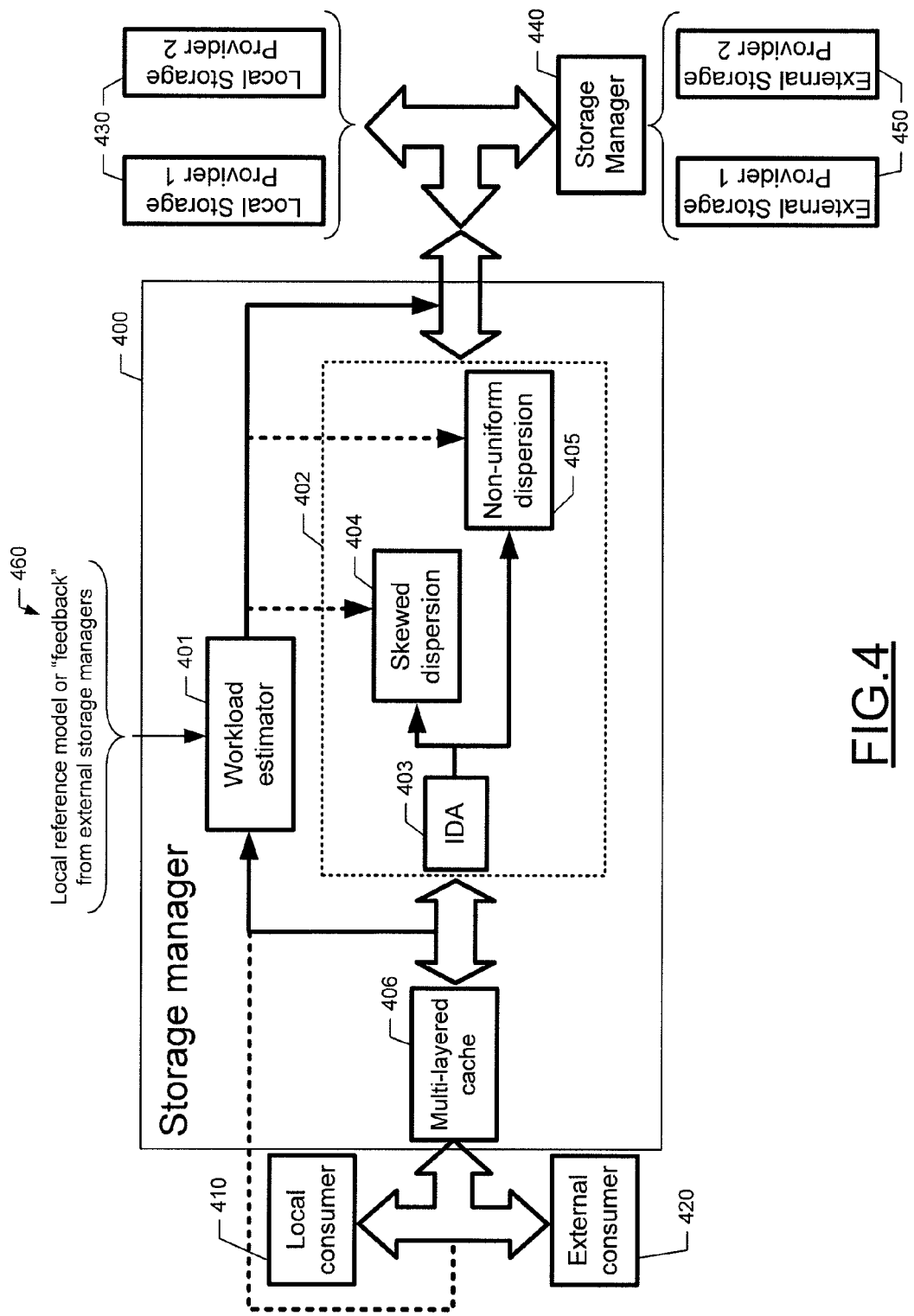
FIG. 4 is a block diagram of a storage manager according to one embodiment of the present invention.

FIG. 4 illustrates a block diagram that further details the construction and operation of a storage manager, or other means for generating a MIMO workload model and means for utilizing the MIMO model to mange storage resources on a distributed storage system. Store manger 350 can used to describe an embodiment of the invention. FIG. 4 depicts local storage manager 400, local storage consumer 410, external storage consumer 420, local storage providers 430, external storage manager 440, and external storage providers 450.

Local storage consumer 410 and external storage consumer 420 can be any entity that is capable of accessing or otherwise utilizing storage, such as, an application running on, for example, controller 20. Storage consumers 410 and 420 can be the originators of data read or write requests. Local storage providers 430 and external storage providers 450 can be any entity that provides storage resources, such as, for example, volatile memory 40 or non-volatile memory 42. Local storage providers 430 and external storage providers 450 can comprise one or more storage containers. Storage providers 430 and 450 can be acted upon by data read or write requests. The utilization of external storage providers 450 can operate through external storage manager 440.

Local storage manager 400 can comprise workload estimator 401 and data dispersing element 402. In some embodiments, local storage manager 400 can further comprise multi-layered cache 403. Data dispersing element 402 can comprise information dispersing algorithm 403, skewed dispersion element 404, and non-uniform dispersion element 405.

Workload estimator 401 can be a feed-forward, predictive controller element of storage manger 400 which is capable of estimating a workload model. Through the use of the workload estimator 401 and a developed workload model, content can be identified, reassigned, or copied to different storage providers. Further, workload estimator 401 can estimate the system's efficiency within operational strategies with respect to power consumption, performance, and reliability. Workload estimator 401 can further manage a skewed or non-uniform data dispersal, through the data dispersing element 402.

Within workload estimator 401, a local workload model can be estimated based on system requests. Workload estimator 401, or other means, can consider requests initiated by external storage managers at 460, such as external storage manager 440, to generate a MIMO workload model of the system. Note that in an initiation or bootstrapping mode, workload estimator may consider a local reference model at 460, which can provide merely a starting point for generating a workload model. In either case, workload estimator 401 can, through predictive control, establish an analytical relationship, utilizing information gathered from system requests, having any number of connected storage containers, storage providers and storage consumers. As such, connectivity and structural changes to the distributed storage system can be estimated and predicted. Further discussion of workload estimator 401 and its operation will be discussed with respect to FIG. 5.

Data dispersing element 402 can be the content management portion of the distributed management system. Data dispersing element 402 can receive read or write requests, and can work under the supervision of workload estimator 401. Information dispersing algorithm (IDA) 403 can comprise an algorithm that calculates erasure codes or codeword numbers to disperse or aggregate data depending on the functionality needed at a particular time. Erasure codes or codewords can be any means of representing data in which the original data can be restored. In some embodiments, IDA 403 can divide and encode a data packet into sub-packets, or codewords, such that if a number of sub-packets are unavailable at a later time, the remaining available packets can be used to restore the data in the original packet. When a write request is received, data dispersing element 402 can receive data associated with the request, and disperse the data as codewords to particular storage providers and storage containers according to a dispersion biasing scheme. On the other hand, when a read request is received, data dispersing element 402 can fetch and aggregate the codewords retrieved from storage containers according to a biasing scheme, and restore the original data.

The erasure codes or codewords can be dispersed or aggregated, depending on the current functionality required, using a biasing scheme. In some embodiments, the biasing scheme can be a skewed dispersion scheme, where skewed dispersion element 404 is utilized. A skewed dispersion scheme considers the locality of the data. In other words, a skewed dispersion scheme can result in centralized or distributed dispersions of data. In other embodiments, the biasing scheme can be a non-uniform dispersion scheme, where non-uniform dispersion element 405 is utilized. A non-uniform dispersion scheme considers the concentration of the data. In other words, a non-uniform dispersion scheme can result in consolidated or loosely coupled dispersions of data. In some embodiments, burst-type allocations can be conducive to a non-uniform dispersion, and prioritizing and delaying-type allocations can be conducive to a skewed content dispersion. Further, in some embodiments, codewords allocation by delaying asynchronous requests and prioritizing synchronous requests can be utilized to conserve energy.

The appropriate biasing scheme can be determined by the data dispersing element 402 from feedback provided by workload estimator 401 based on the MIMO model. Additionally, the data dispersing element 402 can estimate the locality of codewords and the concentration of codewords for future requests. Note that once codewords are distributed to particular external storage providers, the workload estimators on the system can react to the new distribution of data. As such, the workload estimators can begin to fluctuate causing further predictive controller activity to engage. On the other hand, when codewords are stored on local storage providers without dispersion, the workload estimators can remain in a stable condition, assuming that the use of local storage provider results in the minimum power consumption, maximum performance, and highest reliability. Additionally, since data dispersion element 402 can utilize the MIMO model generated by the workload estimator 401, data dispersion element 402 can elaborate on the impacts of content dispersing and represent the impacts from any remote request.

In some embodiments, a request entering the storage manager 400 can be received by a multi-layered cache 406. Multi-layered cache 406 can receive requests to read or write. Further, multi-layered cache 406 can generate an adjustment to a dynamic cache directory according to a determined workload model that is provided by workload estimator 401. If a received request is a read request, multi-layered cache 406 can scan a write directory and a read directory to generate a hit response, before fetching the data from the data dispersing element 402. If a request is a write request, multi-layered cache 406 can fetch the data and pass the data to the data dispersing element 402. In this manner, the multi-layered cache 406 can adjust the number of entries in a cache directory against an estimated number of read and write requests to assist in development of a workload model. Further, the multi-layered cache 406 can adjust a cache pages granularity against an estimated size of data blocks and provide estimates for the next requests to assist in predicting future system activity.

Figure 5:
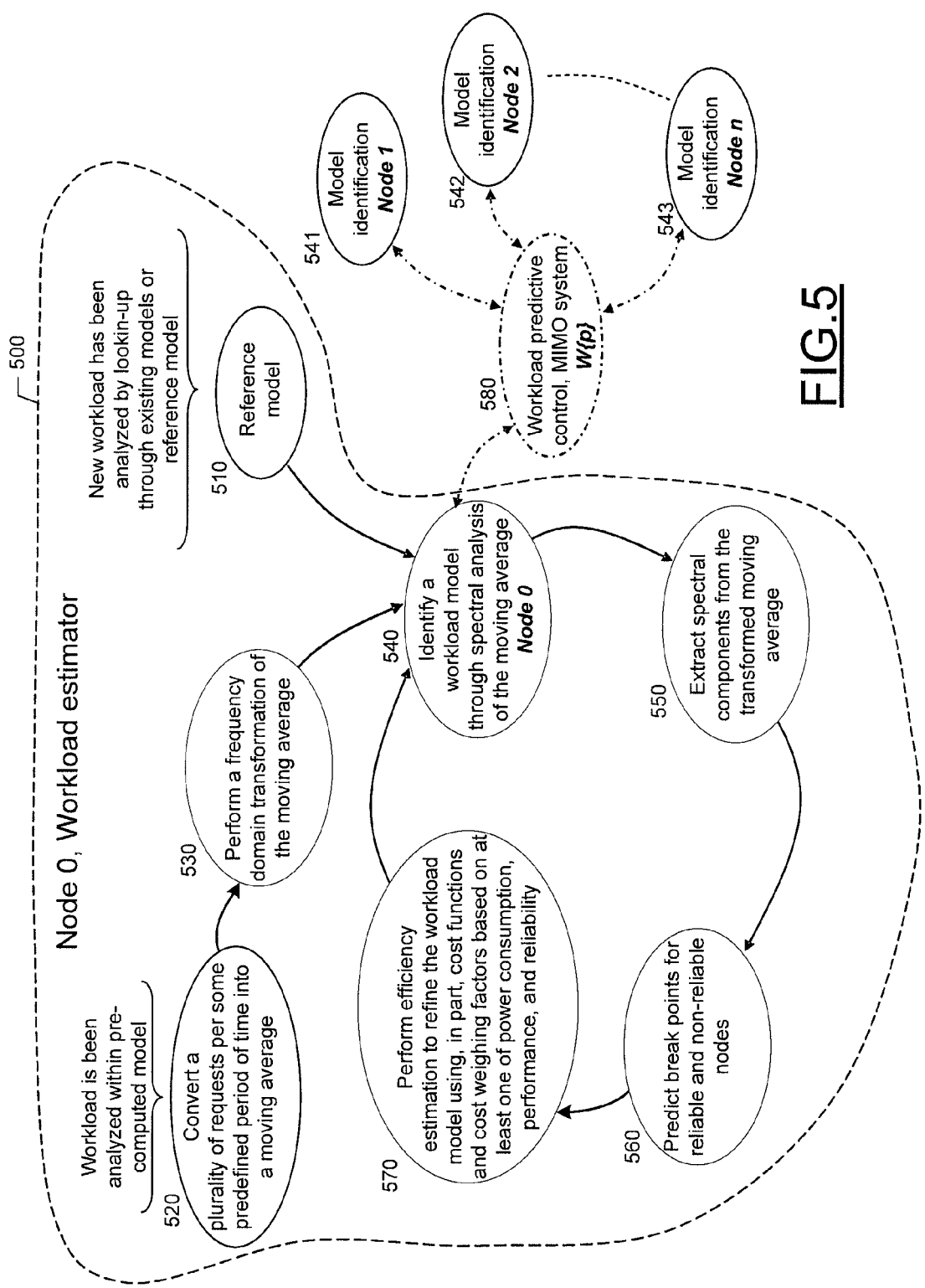
FIG. 5 is a state diagram for a workload estimator according to one embodiment of the present invention.

FIG. 5 depicts a state diagram detailing the operation of a workload estimator, such as for example, workload estimator 401. With respect to FIG. 5, devices connected to a system can be referred to as nodes. As such, FIG. 5 details the operation of a workload estimator for node 0 at 500. Note that the detailed operation of node 1 at 541, node 2 at 542, and node n at 543 are not detailed in FIG. 5, but it is contemplated that the flow diagram with respect to node 0 similarly occurs with respect to node 1, node 2, and node n.

At 510, a reference model can be introduced to workload estimator 500 to be utilized in an initiation or bootstrapping process for the generation of a workload model. The reference model can be an existing workload model that provides merely a starting point for the development of an accurate workload model. Further, workload estimator 500 begins with an access pattern assumption, wherein an access pattern describes a set or sequence of requests, that the model to be developed can depict a read any, write many environment that is energy efficient and utilizes latency masking.

At 520, a plurality of requests per some predefined period of time can be converted into a moving average by workload estimator 500. The workload associated with each request can be analyzed with respect to a pre-computed model which could be the reference model of 510 or a model identified after completion of an earlier model generation process. The requests per period time captured at 520 can be converted into a moving average, and in some embodiments, an infinite moving average. In some embodiments, the infinite moving average can be developed using an auto-regressive integrated moving average (ARIMA). In a sense, the resulting autoregressive model can capture the input and output behavior of the system, which, at this point in the state process, is treated as an unknown black box. An access pattern can be formed as a combination of read and write requests issued at a particular request rate. A resulting workload model can represent a forecasted request rate of a system or device payload as a function y(t) that depends on a request rate for read and write requests $x_i(t)$. As an example, workload model estimation can use the following general form:

$$y(t) = \sum_{m=0}^{M} \alpha_m y(t-m) + \sum_{l=0}^{L} \beta_l x_i(t-l).$$

This form can be elaborated from the general form as $$y(t) = \sum_{m=0}^{M} \alpha_m y(t-m) + x_i(t).$$

Further, from the general form, a moving average can be defined as $$y(t) = \sum_{l=0}^{L} \beta_l x_i(t-l).$$

The values of M and L can show the moving average and autoregressive orders and should be determined in advance.

A frequency domain transformation of the moving average can be taken at 530. The coefficients $\alpha_m$ and $\beta_l$ can be identified using frequency transform methods, such as fast Fourier transform. As a result of the transformation to the frequency domain, the spectral characteristics of the system can be determined.

At 540, a workload model can be identified through spectral analysis of the moving average. Any unknown node on the system can be identified by means of "black box" in a "blind" way. To identify a model, the autoregressive moving average derived from the transformation at 530 can be utilized. As such, basic transfer characteristics of the system, or a node on the system, can be analyzed to generate a workload model. From a node connectivity standpoint, a node on the system can be in a disconnected status, a connected status, or a transitioning status. Each status can be monitored and exploited in identifying a model. Through spectrum analysis of the autoregressive moving average, spectrum components can be identified that represent request bursts or content access patterns. Further, by tracking and analyzing the requests, a history chain can be developed to indicate the node that originated the request.

At 550, spectral components can be extracted from the transformed moving average. Workload estimator 500 can identify broken bursts or detect streams though a pre-processing of the requests per period by means of wavelet analysis. Wavelet analysis can provide checking that can ensure that an observed request is consistent. Accordingly, the consistency of the requests from a node on the system can be captured. As such, the reliability of the systems' input-output signals can be checked, as well as the consistency of system transfer characteristics. In the case of a repeatable run-time spectral component, the associated content access pattern can be defined as a reliable request with a reliable connection and a corresponding reliable node can be identified. In the case of a non-repeatable run-time spectral component, the associated content access pattern can be defined as a non-reliable request, and as such, any identified node can be recognized as suspected of being non-reliable. Using this information, the workload estimator and, in turn, the storage manager can maintain robust relationships with reliable nodes and forecast break points where the reliable node is expected to become non-reliable. Similarly, the storage manager can also forecast when a suspected non-reliable node will become reliable At 560, break points can be predicted for reliable and non-reliable nodes. In some embodiments, a spectral forecasting procedure can be used to predict break points. In the spectral forecasting procedure, cross-correlation between nodes and a cross power spectrum can be estimated through a cross cumulant spectrum analysis. Initially, a cross polyspectra matrix for magnitude and for phase retrieval can be estimated and utilized to separate the repeatable run-time spectrum components and the non-repeatable runtime spectral components. By doing so, a break point can be determined where the transformation between a repeatable run-time spectrum component and a non-repeatable runtime spectral component occurs. By definition, the repeatable run-time spectral component can identify a most relevant content access and can be recognized as a reliable request. On the other hand, a non-repeatable run-time spectrum component can identify the least relevant content access and can be recognized as a non-reliable request. By performing this operation and identifying the coefficients in the frequency domain, an appropriate model stability analysis can be undertaken. As such, by means of the stability analysis, fluctuations between repeatable run-time and non-repeatable run-time states of the spectrum components can be identified.

The spectral forecasting procedure can be applicable in single-input single-output (SISO) cases, singe-input multiple-output (SIMO) cases, and multiple-input single-output (MISO) cases. The most general case, the MIMO case, can be identified as a combination of these cases. Regardless, run-time spectral components can be detected to determine the most relevant content. The spectral forecasting procedure of 560 can also comprise an estimation and allocation procedure which involves biasing the run-time spectrum components detection input/output operations per second (IOPS) to a bandwidth mapping. As a result, if a repeatable run-time spectral component exists, then a local request can be identified. On the other hand, if a non-repeatable run-time spectrum component exists, then an external request can be identified. Accordingly, system model characteristics can be determined, and a system model reconstruction can occur which can include a predictive controller. Additionally, a cross correlation estimate and a cross power spectrum can be identified. As a result, a recombined spectrum domain analysis can be undertaken and estimated through a cross-cumulant spectrum analysis. As such, the repeatable run-time spectral components and the non-repeatable run-time spectral components can be separated and a break point can be predicted where a change from one to the other occurs.

At 570, an efficiency estimation can be performed to refine the workload model using, in part, cost functions and cost weighing factors based on at least one of power consumption, performance, and reliability. The efficiency estimation process can utilize content reliability feedback from storage providers to refine the workload model. Also at 570, the developed workload model can be combined with an existing MIMO workload model to generate an updated MIMO workload model. Additionally, error estimation and tracking can occur for the purposes of further optimization of the model by monitoring the cost functions against a threshold with respect to the operational strategy. Following the efficiency estimation of 570, the workload estimator can return to model identification at 540 and receives a new autoregressive moving average beginning the model update process with respect to node 0 anew.

As discussed earlier, the process occurring within workload estimator 500 with respect to node 0, can also in workload estimators with respect to node 1, node 2, through node n. The compilation of the locally generated MIMO workload models can be correlated at 580 to generate system MIMO workload model by, for example, workload estimator 401 of FIG. 4 or other means. Since every node on the system can have a MIMO workload model, each model can reflect the impacts from any other workload model of any other node. By means of such impacts, a correlation aspect can be identified and unified by means of the MIMO system. As such, repeatable run-time and non-repeatable runtime spectral components can be recognized as aspects of the correlation.

Note that the relationship described by the MIMO model can represent a multitude of workload estimator models in the form of a consolidated entity with multiple-input and multiple-output channels. The MIMO model can be decomposed into a set of single-input multiple-output (SIMO) models which preserve the overall system properties and provide enough flexibility for individual component identification. To further simplify, the SIMO models can be decomposed into single-input single-output (SISO) models, which can be represent a feed-forward workload estimator 401. The identified SISO components can be analyzed for stability for proper reconstruction into SIMO models, which, in turn, can be used for MIMO reconstruction. Accordingly, since each node can implement a storage manager and a workload estimator that can generate a workload model, and every individual workload model can be generated using the MIMO approach, any aspect of any workload external to a particular node can be seen locally. Further, note that in some embodiments, the number of resulting MIMO models can be more than one with respect to a particular system.

Accordingly, the resulting MIMO model can be applied for workload modeling and predictive control of a dynamic distributed storage system with a multitude of uncertainties. With respect to uncertainties, the MIMO model can describe a joining node, and a leaving node. A joining node can involve the synthesis of an associated input and output to the system, because while online, the node can behave as an input and an output. A leaving node can similarly involve the synthesis of an associated input or output because at the moment of removal the node can only be used as an input or an output, but not both. Leaving nodes can be considered in two sub-cases, namely, voluntary leaving or non-voluntary leaving. A voluntary leaving process can be defined by a correct and in-order de-registration by removing a link or pointer in a routing table. From the MIMO model's perspective, the voluntary leaving process can be a controllable pole moving towards the boundary of a stability area. A non-voluntary leaving process can be any type of failure or incorrect and out-of-order leaving, including the omitting of a de-registration process. The model can further describe an update to a node and a node under normal operation. An update to a node can occur when no input or output related topology activity occurs and, as such, the update can provide a mechanism for a stability status update. Finally, a node under normal operation can be identified as merely an idle node.

Figure 6:
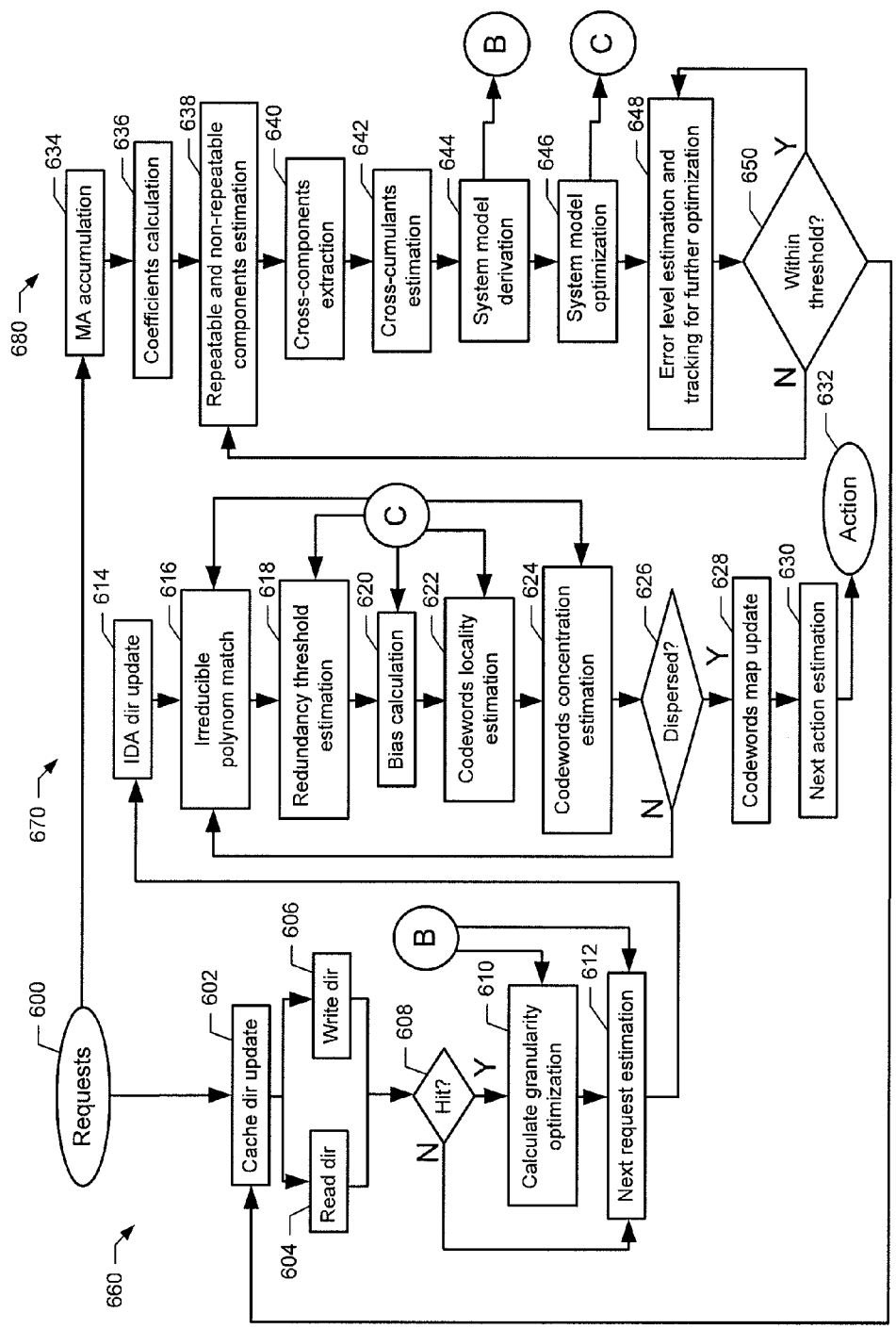
FIG. 6 is a block diagram depicting a method for a distributed storage management solution according to one embodiment of the present invention.

FIG. 6 depicts a block diagram of a method for a distributed storage management solution according to an exemplary embodiment of the present invention. Column 660 of FIG. 6 describes the operation of the optional multi-layered cache 406. Column 670 of FIG. 6 describes the operation of the data dispersing element 402. Column 680 of FIG. 6 describes the operation of the workload estimator 401.

Beginning with the operation of the workload estimator 401 at column 680, requests at 600 can be accumulated as a moving average at 634. The moving average can be used to determine the coefficients $\alpha_m$ and $\beta_j$, as discussed previously, of a workload model at 636. Based on the moving average, repeatable and non-repeatable components can be estimated at 638. At 640, cross-components of the moving average can be extracted, and at 642, cross-cumulants can be estimated to develop a workload cross-coupling matrix. At 644, the system model can be derived, and at 646, the system model can be optimized with respect to an operational strategy. At 648, an error level estimation and tracking can occur for further model optimization. At 650, a check of system operation can occur with respect to a predetermined threshold to determine if the model of the system is properly optimized. If the current operation of the system falls within the threshold, the process can return to 648 and again perform error level estimation and tracking for further optimization of the model. If the current operation of the system falls outside the threshold, the process can return to 638 to again estimate repeatable and non-repeatable components of a new moving average. Regardless of whether the current operation of the system is within or outside the threshold, the model can be used to perform a cache directory update at 602.

With respect to the operation of the optional multi-layered cache 406, requests at 600 can be used in conjunction with the present workload model to perform a cache directory update at 602. Depending upon whether the currently analyzed request is read request or a write request, the read directory or the write directory may be scanned at 604 and 606. If a hit is identified, at 608, the multi-layered cache can calculate an optimized granularity with the assistance of the derived system model from 644. The process can then proceed to the next request estimation at 612. If at 608, no hit is identified, then the next request estimation can proceed at 612. From 612, a request can cause an IDA directory update at 614.

With respect to the operation of the data dispersing element 402, requests either directly from 600 or form the multi-layered cache can be used to update an IDA directory at 614. An irreducible polynomial match can then occur at 616 using the optimized system model from 646. A redundancy threshold estimation can be performed at 618, also utilizing the optimized system model form 646. At 622, the codewords locality can be estimated utilizing the optimized system model from 646. Similarly, the codewords concentration can be estimated at 624, again utilizing the optimized system model from 646. If the estimations determine that the target information is not dispersed at 626, then the process can begin again by determining the irreducible polynomial match at 616. If the estimations determine that the target information is dispersed at 626, then a codewords map update can occur at 628. Upon updating the codewords map, a next action estimation can occur, where an action can be dispersing or aggregating data. Finally, at 632, an action can occur, such as, dispersing or aggregating data.

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method comprising:
receiving a plurality of requests per some predefined period of time on a distributed storage system and generating a multiple-input, multiple-output (MIMO) workload model of a distributed storage environment on at least one predictive controller; and
utilizing the MIMO workload model on the at least one predictive controller to manage storage resources on a distributed storage system, wherein utilizing the MIMO workload model includes aggregating or dispersing data with an information dispersing algorithm that calculates erasure codes or codeword numbers to disperse or aggregate data depending on whether dispersion of the data or aggregation of the data is needed at a particular time.

2. The method of claim 1 wherein generating the MIMO workload model comprises:
converting the plurality of requests per some predefined period of time into a moving average;
performing a frequency domain transformation of the moving average;
identifying a workload model through spectral analysis of the moving average;
extracting spectral components from the transformed moving average;
predicting break points for reliable and non-reliable nodes; and
performing an efficiency estimation to refine the workload model using, in part, cost functions and cost weighting factors based on at least one of power consumption, performance, and reliability.

3. The method of claim 2, wherein the method is performed separately for read and write requests.

4. The method of claim 2 wherein generating the MIMO workload model further comprises:
performing an error level estimation and determining an associated threshold, and
tracking an error level against the threshold.

5. The method of claim 1, further comprising correlating the MIMO workload models on each of the at least one predictive controllers into a system MIMO workload model.

6. The method of claim 1, wherein data is dispersed according to a skewed dispersion scheme and data is aggregated according to a skewed dispersion scheme.

7. The method of claim 1, wherein data is dispersed according to a non-uniform dispersion scheme and data is aggregated according to a non-uniform dispersion scheme.

8. The method of claim 1, wherein each predictive controller in the plurality of predictive controllers comprises a multi-layered cache.

9. An apparatus comprising at least one processor and at least one memory including computer program code, the at least one memory and the computer program code configured to, with the at least one processor, direct the apparatus at least to:
receive a plurality of requests per some predefined period of time on a distributed storage system and generate a multiple-input, multiple-output (MIMO) workload model; and
disperse or aggregate data with an information dispersing algorithm that calculates erasure codes or codeword numbers to disperse or aggregate data depending on whether dispersion of the data or aggregation of the data is needed at a particular time.

10. The apparatus of claim 9, further comprising a multi-layered cache.

11. The apparatus of claim 9, wherein the apparatus directed to generate the MIMO workload model includes being directed to:
convert the plurality of requests per some predefined period of time into a moving average;
perform a frequency domain transformation of the moving average;
identify a workload model through spectral analysis of the moving average;
extract spectral components from the transformed moving average;
predict break points for reliable and non-reliable nodes; and
perform an efficiency estimation to refine the workload model using, in part, cost functions and cost weighting factors based on power consumption, performance, and reliability.

12. The apparatus of claim 9, wherein the apparatus directed to implement the feed forward workload estimator is further directed to perform an error level estimation and determine an associated threshold, and track an error level against the threshold.

13. The apparatus of claim 9, wherein the apparatus is further directed to cause data to be dispersed or aggregated according to a skewed dispersion scheme.

14. The apparatus of claim 9, wherein the apparatus is further directed to cause data to be dispersed or aggregated according to a non-uniform dispersion scheme.

15. An apparatus comprising:
means for receiving a plurality of requests per some predefined period of time on a distributed storage system and generating a multiple-input, multiple-output (MIMO) workload model of a distributed storage environment;
means for utilizing the MIMO workload model to manage storage resources on a distributed storage system, wherein the means for utilizing the MIMO workload model includes means for aggregating or means for dispersing data with an information dispersing algorithm that calculates erasure codes or codeword numbers to disperse or aggregate data depending on whether dispersion of the data or aggregation of the data is needed at a particular time.

16. The apparatus of claim 15, further comprising a means for correlating a plurality of MIMO workload models into a system MIMO workload model.

17. A computer program product comprising a computer-readable storage medium having computer-readable program code portions stored therein, the computer-readable program code portions comprising:
a first executable portion configured to receive a plurality of requests per some predefined period of time on a distributed storage system and generate a multiple-input, multiple-output (MIMO) workload model of a distributed storage environment; and
a second executable portion configured to manage storage resources on a distributed storage system by utilizing the MIMO workload model, wherein being configured to manage storage resources includes aggregating or dispersing data with an information dispersing algorithm that calculates erasure codes or codeword numbers to disperse or aggregate data depending on whether dispersion of the data or aggregation of the data is needed at a particular time.

18. The computer program product of claim 17, wherein the first executable portion configured to generate a MIMO workload model of a distributed storage environment is further configured to:
  convert a plurality of requests per some predefined period of time into a moving average;
  perform a frequency domain transformation of the moving average;
  identify a workload model through spectral analysis of the moving average;
  extract spectral components from the transformed moving average;
  predict break points for reliable and non-reliable nodes; and
  perform an efficiency estimation to refine the workload model using, in part, cost functions and weighting factors based on power consumption, performance, and reliability.

19. The computer program product of claim 17, further comprising a third executable portion configured to correlate multiple MIMO workload models into a system MIMO model.

20. The computer program product of claim 18, wherein the first executable portion configured to generate a MIMO workload model of a distributed storage environment is further configured to:
  perform an error level estimation and determine an associated threshold; and
  track an error level against the threshold.

21. The computer program product of claim 17, wherein the second executable portion is further configured to disperse data according to a skewed dispersion scheme and aggregate data according to a skewed dispersion scheme.

22. The computer program product of claim 17, wherein the second executable portion is further configured to disperse data according to a non-uniform dispersion scheme and aggregate data according to a non-uniform dispersion scheme.

23. The computer program product of claim 17, wherein the second executable portion is further configured to implement a multi-layered cache.

* * * * *

UNITED STATES PATENT AND TRADEMARK OFFICE
CERTIFICATE OF CORRECTION

| | | |
|---|---|---|
| PATENT NO. | : 8,005,654 B2 | Page 1 of 1 |
| APPLICATION NO. | : 11/957765 | |
| DATED | : August 23, 2011 | |
| INVENTOR(S) | : Boldyrev et al. | |

It is certified that error appears in the above-identified patent and that said Letters Patent is hereby corrected as shown below:

Column 9
Line 65, "and Mare integers." should read --and M are integers.--.

Column 10
Line 16, in the equation, "ϕL" should read --σL--.

Signed and Sealed this
Ninth Day of October, 2012

David J. Kappos
*Director of the United States Patent and Trademark Office*